United States Patent [19]

Saito et al.

[11] Patent Number: 4,847,498
[45] Date of Patent: * Jul. 11, 1989

[54] RADIATION IMAGE READ-OUT METHOD

[75] Inventors: Tokukazu Saito; Masamitsu Ishida, both of Kanagawa, Japan

[73] Assignee: Fuji Photo Film Co., Ltd., Kanagawa, Japan

[*] Notice: The portion of the term of this patent subsequent to May 16, 2006 has been disclaimed.

[21] Appl. No.: 695,331

[22] Filed: Jan. 28, 1985

[30] Foreign Application Priority Data

Jan. 27, 1984 [JP] Japan .................................. 59-13117

[51] Int. Cl.$^4$ .............................................. G03C 5/16
[52] U.S. Cl. .................... 250/327.2; 250/484.1
[58] Field of Search ................... 250/484.1, 327.2, 368; 358/111

[56] References Cited

U.S. PATENT DOCUMENTS 3,975,636  8/1976  Klein, Jr. et al. ................ 250/327.2
4,075,483  2/1978  Tancrell et al. ..................... 250/368
4,496,973  1/1985  Horikawa et al. ............... 250/327.2
4,578,581  3/1986  Tanaka et al. ................... 250/484.1

Primary Examiner—Janice A. Howell
Assistant Examiner—Richard Hanig
Attorney, Agent, or Firm—Sughrue, Mion, Zinn, Macpeak & Seas

[57] ABSTRACT

A radiation image stored in a stimulable phosphor sheet is read out by exposing the stimulable phosphor sheet to stimulating rays which cause it to emit light in proportion to the radiation energy stored, and photoelectrically detecting the emitted light. Prior to final read-out for obtaining an electric image signal used for reproducing a visible image, preliminary read-out is conducted by uniformly exposing the whole surface of the stimulable phosphor sheet to stimulating rays to have the whole surface of the stimulable phosphor sheet emit light, detecting the amount of the light emitted by a specific region of the stimulable phosphor sheet, and grasping the radiation image information on the basis of the detected light amount.

2 Claims, 1 Drawing Sheet

FIG. 1
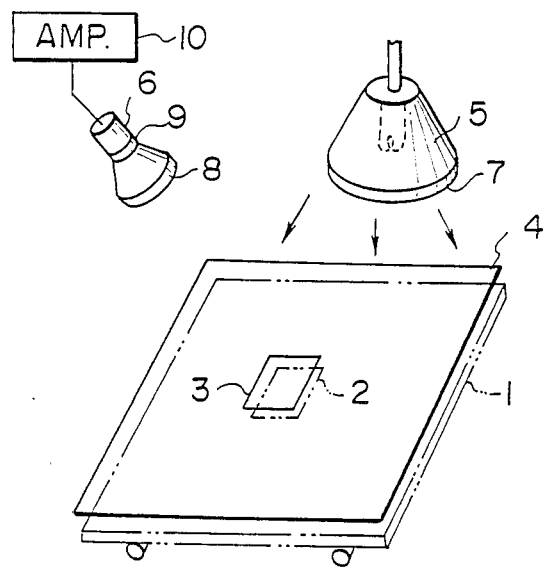
FIG. 2 FIG. 3 FIG. 4
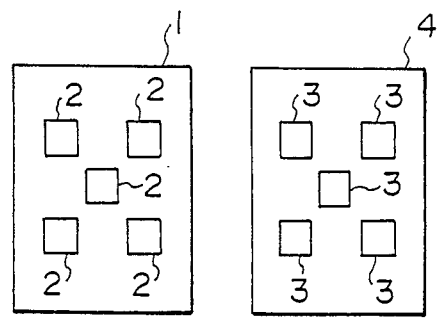 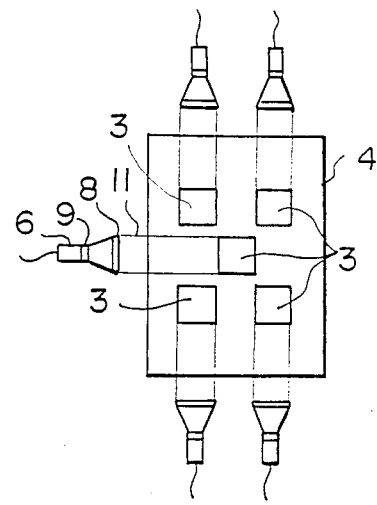

RADIATION IMAGE READ-OUT METHOD

BACKGROUND OF THE INVENTION

1. Field of the Invention

This invention relates to a radiation image readout method for exposing a stimulable phosphor sheet carrying a radiation image stored therein to stimulating rays which cause the stimulable phosphor sheet to emit light in proportion to the radiation energy stored, and photoelectrically detecting the emitted light by use of a photodetector.

2. Description of the Prior Art

When certain kinds of phosphors are exposed to a radiation such as X-rays, $\alpha$-rays, $\beta$-rays, $\gamma$-ray, cathode rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and converted to an electric image signal, which is processed as desired to reproduce a visible image on a recording medium such as a photographic light-sensitive material or on a display device such as a cathode ray tube (CRT).

The radiation image recording and reproducing system using a stimulable phosphor sheet is advantageous over conventional radiography using a silver halide photographic material in that the image can be recorded over a very wide range (latitude) of radiation exposure and further in that the electric signal used for reproducing the visible image can be freely processed to improve the image quality for viewing, particularly for diagnostic purposes. In more detail, since the amount of light emitted upon stimulation after the radiation energy is stored in the stimulable phosphor varies over a very wide range in proportion to the amount of energy stored therein, it is possible to obtain an image having desirable density regardless of the amount of exposure of the stimulable phosphor to the radiation by reading out the emitted light with an appropriate read-out gain and converting it to an electric signal to reproduce a visible image on a recording medium or a display device. The electric signal may further be processed as desired to obtain a radiation image suitable for viewing, particularly for diagnostic purposes. This is very advantageous in practical use.

As mentioned above, in the radiation image recording and reproducing system using a stimulable phosphor sheet, compensation for deviation of the level of the radiation energy stored in the stimulable phosphor sheet from a desired level can easily be carried out by adjusting the read-out gain to an appropriate value when photoelectrically reading out the light emitted from the stimulable phosphor sheet upon stimulation thereof. Therefore, the quality of the reproduced radiation image is not adversely affected by a fluctuation in radiation dose due to fluctuating tube voltage or MAS value of the radiation source, a variation in the sensitivity of the stimulable phosphor sheet or the photodetector, a change in radiation dose according to the condition of the object, or a fluctuation in the radiation transmittance according to the object, and the like. Also, it is possible to obtain a desirable radiation image even when the radiation dose to the object is low. Further, it is possible to obtain a radiation image having a high image quality of high contrast, high sharpness and low noise, and the like, by converting the light emitted from the stimulable phosphor sheet into an electric signal, and processing the electric signal as desired. Particularly, when the radiation image is used for medical diagnosis, it is possible to obtain a radiation image processed in the manner most suitable for a particular portion of the human body such as the heart, the chest or the like, thereby realizing an improvement in diagnostic efficiency and accuracy.

However, in order to eliminate various influences caused by the fluctuation of radiographic exposure conditions and/or to obtain a radiation image having a high image quality or a high diagnostic efficiency and accuracy, it is necessary to investigate the radiation image information stored in the stimulable phosphor sheet, for example, image input conditions, or the image input pattern which is determined by the portion of the body (for example, the chest or the abdomen) or the image recording method used, such as plain image recording or contrasted image recording, before final image read-out is conducted for obtaining an electric image signal for use in reproduction of a visible image for viewing, particularly for diagnostic purposes, and then to adjust the read-out conditions, for example, the read-out gain, or the image processing conditions to appropriate values on the basis of the detected radiation image information. It is also necessary to determine the scale factor to optimize the resolution in accordance with the contrast of the image input pattern.

One method of grasping the radiation image information stored in the stimulable phosphor sheet prior to the final read-out is proposed, for example, in U.S. Pat. No. 4,578,581. In the method, preliminary read-out for grasping the radiation image information is conducted by uniformly exposing the whole surface of the stimulable phosphor sheet to stimulating rays and detecting the amount of light emitted by the whole surface of the stimulable phosphor sheet prior to the final read-out for obtaining an electric image signal which is used for reproducing a visible image for viewing, particularly for diagnostic purposes.

On the other hand, in a method disclosed, for example, in Japanese Unexamined Patent Publication No. 58(1983)-67240, the preliminary read-out for grasping the radiation image information is conducted by scanning the stimulable phosphor sheet carrying a radiation image stored therein by stimulating rays of a level lower than the level of the stimulating rays used in the final read-out and detecting the light emitted by the stimulable phosphor sheet during the scanning. The method proposed in Japanese Unexamined Patent Publication No. 59(1984)-19939 is advantageous over the method disclosed in Japanese Unexamined Patent Publication No. 58(1983)-67240 in that the radiation image information stored in the stimulable phosphor sheet can be grasped simply and quickly. However, the former has the drawback described below.

Namely, even when an image of the same portion of the object is recorded under the same radiation exposure conditions, the amount of the light emitted by the whole surface of the stimulable phosphor sheet will differ if the size of the stimulable phosphor sheet or the area thereof actually exposed to X-rays is different. Therefore, when read-out conditions and/or image processing conditions are adjusted on the basis of the detected light amount, the read-out conditions and/or image processing conditions become different in accordance with a change in the size of the stimulable phosphor sheet or a change in the area thereof actually exposed to X-rays.

SUMMARY OF THE INVENTION

The primary object of the present invention is to provide a radiation image read-out method for consistently grasping the radiation image information by the preliminary read-out even when, for example, an image of the same portion of an object is recorded under the same radiation exposure conditions but the size of the stimulable phosphor sheet used is different or the area thereof actually exposed to the radiation is different.

Another object of the present invention is to provide a radiation image read-out method which realizes consistent reproduction of a visible image having an improved image quality, particularly a high diagnostic efficiency and accuracy.

The present invention provides a radiation image read-out method for exposing a stimulable phosphor sheet carrying a radiation image stored therein to stimulating rays which cause the stimulable phosphor sheet to emit light in proportion to the radiation energy stored, and photoelectrically detecting the emitted light, wherein the improvement comprises, prior to final read-out for obtaining an electric image signal for use in reproduction of a visible image for viewing purposes, conducting preliminary read-out by uniformly exposing the whole surface of said stimulable phosphor sheet to stimulating rays to have the whole surface of said stimulable phosphor sheet emit light, detecting the amount of the light emitted by a specific region of said stimulable phosphor sheet, and grasping the radiation image information on the basis of the detected light amount.

The detection of the amount of the light emitted by a specific region of the stimulable phosphor sheet may be conducted by use of a filter having the property of transmitting the stimulating rays and absorbing the light emitted by the stimulable phosphor sheet and having a through hole at the portion corresponding to the specific region of the stimulable phosphor sheet.

The specific region of the stimulable phosphor sheet may be an arbitrarily selected region and may, for example, be the center region of the sheet. The specific region need not necessarily be a single portion of the stimulable phosphor sheet and may consist of a plurality of portions. The specific region may be selected in accordance with the image recording portion and/or image recording conditions.

In the present invention, even when an image of the same portion of an object is recorded under the same radiation exposure conditions but the size of the stimulable phosphor sheet is different or the area thereof actually exposed to X-rays is different, it is possible to consistently grasp the image information. Therefore, it becomes possible to easily adjust the read-out conditions and/or image processing conditions to optimal values on the basis of the grasped image information. As a result, it becomes possible to consistently obtain a visible image having an improved image quality, particularly a high diagnostic efficiency and accuracy.

BRIEF DESCRIPTION OF THE DRAWINGS

FIG. 1 is a schematic view showing an embodiment of the radiation image read-out method in accordance with the present invention in the case o general image recording, FIG. 2 is a schematic view showing an example of the specific region of a stimulable phosphor sheet in the case of chest image recording, FIG. 3 is a schematic view showing an example of the filter used in the case of chest image recording, and FIG. 4 is a schematic view showing an example of the method of detecting the light emitted by the specific region of the stimulable phosphor sheet by use of the filter of FIG. 3.

DESCRIPTION OF THE PREFERRED EMBODIMENTS

The present invention will hereinbelow be described in further detail with reference to the accompanying drawings.

FIG. 1 shows an embodiment of the radiation image read-out method in accordance with the present invention in the case of general image recording. In the case of general image recording, since the region which should be diagnosed is usually the center region of a stimulable phosphor sheet 1, the center region thereof is selected as a specific region 2. When preliminary read-out is conducted, the whole surface of the stimulable phosphor sheet 1 is covered by a filter 4 having the property of transmitting the stimulating rays and absorbing the light emitted by the stimulable phosphor sheet 1 and provided with a through hole 3 at the portion corresponding to the specific region 2. The stimulating rays are emitted by a stimulating ray source 5 positioned above the filter 4, and the whole surface of the stimulable phosphor sheet 1 is uniformly exposed to the stimulating rays. The stimulating rays pass through the filter 4 and impinge upon the whole surface of the stimulable phosphor sheet 1. When exposed to the stimulating rays, the whole surface of the stimulable phosphor sheet 1 emits light. Of the emitted light, the light emitted by the portion covered by the filter 4 is absorbed by the filter 4, and only the light emitted by the specific region 2 at which the through hole 3 is positioned is detected by a photodetector 6. On the basis of the detected light amount, the image information stored in the stimulable phosphor sheet 1 is grasped.

On the basis of the grasped image information, the final read-out conditions such as a read-out gain and/or image processing conditions are adjusted to appropriate values.

In FIG. 1, the reference numeral 7 denotes a filter for transmitting the stimulating rays and absorbing the light emitted by the stimulable phosphor sheet 1, and the reference numeral 8 denotes a diffusion plate. The reference numeral 9 designates a filter for transmitting the light emitted by the stimulable phosphor sheet 1 and absorbing the stimulating rays, and the reference numeral 10 denotes an amplifier.

In the case of chest image recording, since the amount of the light emitted by the portion of the stimulable phosphor sheet 1 where an image of the lungs is recorded is important, the specific region 2 should preferably be constituted by five sections as shown in FIG. 2 so that the specific region 2 corresponds to the lungs even in the front or lateral image recording or even when the stimulable phosphor sheet 1 is positioned upside down in image recording. In this case, as shown in FIG. 3, the filter 4 should be provided with he through holes 3 at positions corresponding to the five sections of the specific region 2. The filter 4 is positioned above the stimulable phosphor sheet 1, and the whole surface of the sheet 1 is uniformly exposed to the stimulating rays as shown in FIG. 1. The light emitted by the stimulable phosphor sheet 1 and passing through the through holes 3 is detected by the photodetector 6 via a light guide member 11 positioned on the stimulating ray source side of the filter 4 as shown in FIG. 4. In this case, though the stimulating rays enter the light guide member 11, they are cut off by the filter 9. In FIG. 4, the reference numerals 8 and 9 designate the same elements as those in FIG. 1.

In the case of the chest image recording as described above, the image information may be grasped on the basis of the amount of the light emitted by the whole specific region 2 constituted by the five sections, or on the basis of the maximum among the amounts of the light emitted by the five sections of the specific region 2.

The image information thus grasped is used for adjusting the read-out conditions and/or image processing conditions as described above.

By the term "read-out conditions" as used herein are meant various conditions affecting the relationship between the amount of the light emitted by the stimulable phosphor sheet at the final read-out step and the output of the read-out apparatus, for example, the read-out gain determining the relationship between the input and the output of the read-out apparatus, and the scale factor.

By "image processing conditions" are meant various conditions affecting the relationship between the input and the output of the electric image signal at the image processing step, for example, gradation processing conditions.

The read-out conditions and the image processing conditions are adjusted for obtaining a visible image suitable for viewing, particularly for diagnostic purposes, in accordance with the image recording portion and/or image recording conditions. The read-out conditions are adjusted also for the purpose of sending the electric image signal in a desirable condition to the image processing means.

Therefore, in general, the read-out conditions and/or image processing conditions are basically determined by the image recording portion and/or image recording conditions which are known in advance, and are ultimately adjusted by correcting on the basis of the image information recorded on the stimulable phosphor sheet and obtained by the preliminary read-out.

That is, when the read-out conditions and/or image processing conditions are adjusted on the basis of the image information grasped by the method of the present invention, they are adjusted on the basis of not only the amount of the light emitted by the specific region of the stimulable phosphor sheet during the preliminary read-out but also the image recording portion and/or image recording conditions.

Accordingly, when the read-out conditions are adjusted, it is possible to adjust the read-out gain on the basis of the amount of the light emitted by the specific region of the stimulable phosphor sheet, and to adjust the scale factor on the basis of the image recording portion and/or image recording conditions.

We claim:

1. A radiation image read-out method for exposing a stimulable phosphor sheet carrying a radiation image stored therein to stimulating rays which cause the stimulable phosphor sheet to emit light in proportion to the radiation energy stored and photoelectrically detecting the emitted light, wherein the improvement comprises, prior to final read-out for obtaining an electric image signal for use in reproduction of a visible image for viewing purposes, conducting preliminary read-out by uniformly exposing the whole surface of said stimulable phosphor sheet to stimulating rays to have the whole surface of said stimulable phosphor sheet emit light, detecting the amount of light emitted by a specific region of said stimulable phosphor sheet, and grasping the radiation image information on the basis of the detected light amount, wherein detection of the amount of the light emitted by said specific region of said stimulable phosphor sheet is conducted by use of a filter having the property of transmitting the stimulating rays and absorbing the light emitted by said stimulable phosphor sheet and having a through hole at a position corresponding to said specific region.

2. A method as defined in claim 1 wherein said specific region is constituted by a plurality of sections, and said filter has a plurality of the through holes at positions corresponding to the sections of said specific region.

* * * * *